United States Patent [19]

Costes

[11] Patent Number: 4,571,323

[45] Date of Patent: Feb. 18, 1986

[54] COOLING DEVICE

[75] Inventor: Didier Costes, Paris, France

[73] Assignee: Commissariat a l'Energie Atomique, Paris, France

[21] Appl. No.: 385,253

[22] Filed: Jun. 4, 1982

[30] Foreign Application Priority Data

Jun. 9, 1981 [FR] France ............................. 81 11309

[51] Int. Cl.$^4$ .............................................. G21C 15/18
[52] U.S. Cl. ....................................... 376/282; 376/298;
376/299; 376/391; 376/402
[58] Field of Search ............... 376/282, 298, 299, 391,
376/402, 310, 314, 313

[56] References Cited

U.S. PATENT DOCUMENTS

| 3,379,613 | 4/1968 | Tagami et al. ....................... 376/282 |
| 3,431,168 | 3/1969 | Kjemtrup . | |
| 3,459,635 | 8/1969 | Bevilacqua et al. ................. 376/313 |
| 3,911,684 | 10/1975 | Busey .................................. 376/391 |
| 4,022,655 | 5/1977 | Gauditz et al. ...................... 376/283 |
| 4,057,465 | 11/1977 | Thompson et al. .................. 376/298 |
| 4,138,319 | 2/1979 | Schabert et al. ..................... 376/282 |
| 4,416,850 | 11/1983 | Kodama et al. ...................... 376/310 |
| 4,430,293 | 2/1984 | Callaghan et al. ................... 376/314 |

FOREIGN PATENT DOCUMENTS

| 685256 | 1/1967 | Belgium . |
| 2634780 | 2/1977 | Fed. Rep. of Germany . |
| 2732774 | 2/1979 | Fed. Rep. of Germany . |
| 2246028 | 4/1975 | France . |

OTHER PUBLICATIONS

Atomkernenergie (ATKE) Bd. 19 (1972) Lfg.3.

Primary Examiner—Deborah L. Kyle
Assistant Examiner—Richard W. Wendtland
Attorney, Agent, or Firm—Kerkam, Stowell, Kondracki, & Clarke

[57] ABSTRACT

Device for the post-accident cooling of the confinement enclosure of a pressurized water nuclear reactor, wherein it comprises in series a turbine supplied by the hot, humid air contained in the enclosure, a condenser in which the air from the turbine is dried and cooled by thermal contact with an external cooling fluid, and a compressor actuated by the turbine, and which returns the dried air into the enclosure.

9 Claims, 2 Drawing Figures

COOLING DEVICE

BACKGROUND OF THE INVENTION

The present invention relates to a post-accident cooling device for the confinement enclosure of a pressurized water nuclear reactor.

Nuclear reactors cooled with pressurized light water for generating electricity are located in confinement enclosures designed for obviating the effects of potential accidents involving the fracture of the wall containing the pressurized water. These enclosures can resist the temperature and pressure conditions due to the rapid expansion of the hot water resulting from such a pressure. However, it is then necessary to cool the reactor core and the actual enclosure to prevent a progressive rise of the pressure and temperature due to the production of residual radioactive power in the core.

Various means have already been proposed for cooling the enclosure under accident conditions. Thus, it is possible to internally sprinkle water by using pumps to deliver water taken from an external reservoir. It is also possible to have within the enclosure a reserve of ice, which is able to cool the enclosure for a significant time without it being necessary to have recourse to an external energy supply.

However, in general terms the hitherto known devices for cooling the enclosure of a reactor require an external energy supply over a varying length of time if it is desired to prevent pressure and temperature conditions which are dangerous for the enclosure. The availability of this energy involves the provision of special installations and leads to a reliability problem in such a way that it is obviously desirable to have a device able to operate in an autonomous manner without any external energy supply.

BRIEF SUMMARY OF THE INVENTION

The present invention therefore relates to a device for cooling the enclosure of a pressurized nuclear reactor, which does not have the disadvantages of the prior art devices and which can in particular operate in an autonomous manner without any external energy supply being necessary. More specifically the invention relates to a device operating in accordance with a condensation cycle on the basis of a heat exchange between the pressurized, moist, hot air contained in the enclosure and an external, cold, heat transfer fluid for obtaining a mechanical energy, which makes it possible to perform all the functions necessary for safeguarding the installation and particularly cooling pumping operations.

Therefore the present invention relates to a device for the post-accident cooling of the confinement enclosure of a pressurized water nuclear reactor, wherein it comprises in series a turbine supplied by the hot, humid air contained in the enclosure, a condenser in which the air from the turbine is dried and cooled by thermal contact with an external cooling fluid, and a compressor actuated by the turbine and which returns the dried air into the enclosure.

Thus, the turbocompressor system keeps rotating after starting, when the mechanical power supplied by the turbine, which expands a mixture of hot air and steam, is equal to or in excess of that absorbed by the compressor, which recompresses the same cooled air flow and a steam flow, which is considerably reduced by passage in the condenser. This rotation ensures the circulation in the apparatus, after recycling, of all the moist air contained in the confinement enclosure until the temperature difference between said air and the cooling fluid becomes inadequate.

According to a preferred embodiment of the invention the turbine is also used for operating a first pump permitting the supply of the condenser with cooling fluid from at least one reservoir, preferably located outside the enclosure. Thus, the actual device according to the invention ensures the circulation of the cooling fluid in the condenser without any external energy supply.

Preferably the air from the compressor passes through a cooling exchanger before returning into the enclosure. The temperature of the air returned to the enclosure is therefore much lower than the temperature of the air already in the enclosure. Obviously the cooling fluid used in the exchanger can be the same as that used in the condenser. The same pump operated by the turbine can then circulate the fluid in both the condenser and the exchanger.

The return of the cooling fluid to the reservoir can be brought about by means of a row of sprinklers located above the reservoir, which cools the fluid by bringing it into contact with the outside atmosphere before it returns to the reservoir.

According to another feature of the invention the turbine, whose rotation is controlled by the pressure reduction produced in the condenser can also be used for operating a second pump making it possible to inject boric acid solution contained in an appropriate reservoir directly into the primary circuit of the reactor, although this safety injection is normally ensured by an external energy source. It is obviously possible to ensure the injection function in a redundant manner by the energy of the turbine and by outside energy. This feature is particularly advantageous because it enables the device according to the invention to simultaneously cool the reactor core, even in the case of a failure of the external energy supply, which in practice prevents the formation of non-condensable gases, which would inhibit the operation of the condensation cycle in the case of any deterioration of the core.

According to another feature of the invention, the turbine can also be used for operating a third pump making it possible to extract condensation water from the condenser in order to reinject it into the reactor enclosure via a row of sprinklers positioned in the upper part thereof. Thus, it is possible to keep the steam quantity contained in the enclosure at a relatively constant level, which ensures a correct operation of the condensation cycle.

Obviously the starting of the turbine and the compressor of the device according to the invention during a pressure rise in the enclosure resulting from an accident involves the use of special means. Thus, it would be possible to have recourse to stored energy by using e.g. a compressed air starter or a battery-operated electric starter automatically put into operation during an abnormal pressure rise in the enclosure. However, for the safety reasons indicated hereinbefore, during starting it is also preferable to have autonomous means requiring no external energy supply.

According to a first embodiment of the invention the inner space of the condenser can in particular be connected to the exterior of the enclosure by a discharge pipe equipped with a starting valve, which only permits a flow to the outside, said pipe being equipped with retention and filtering means limiting the discharge of radioactive material. Preferably the starting valve opens when a given overpressure is established in the enclosure. It is clear that when the valve opens as a result of the pressure difference between the air contained in the enclosure and the external atmosphere, there is an air circulation in the device making it possible to start the turbine and the condenser, thus ensuring the autonomy of the device.

According to a second embodiment of the invention, the inner space of the condenser is initially isolated from the air contained in the enclosure upstream by a diaphragm, which ruptures when a given overpressure occurs in the enclosure and downstream by a valve. In the same way it is apparent that the pressure difference between the air contained in the enclosure and the air contained in the condenser causing the rupture of the diaphragm makes it possible to bring about an air stream towards the condenser ensuring the starting of the turbine and the compressor after opening the valve.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
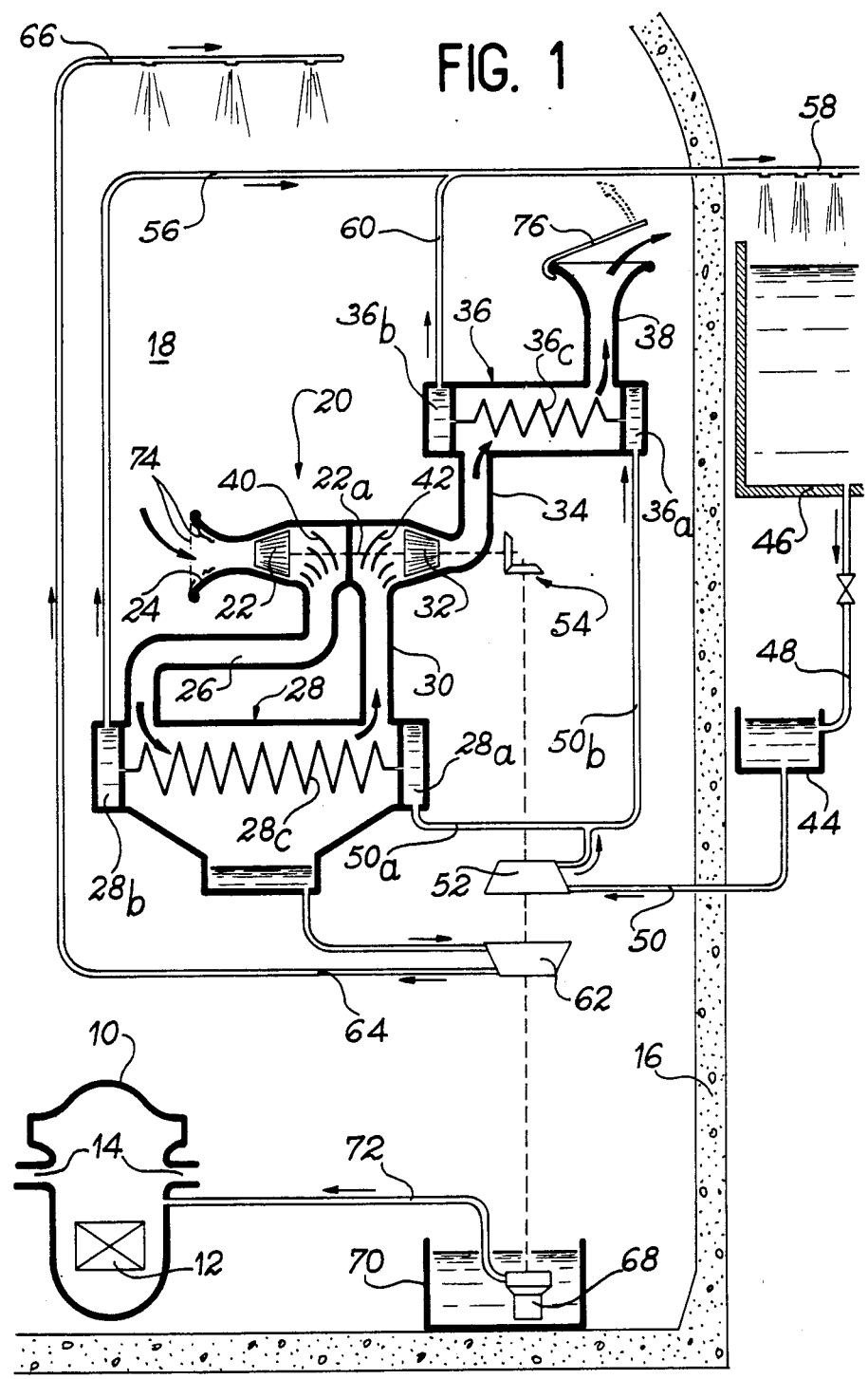
FIG. 1 a diagrammatic sectional view showing the installation of a first embodiment of the device according to the invention in a pressurized water nuclear power station, whose reactor vessel and confinement enclosure are shown.

The device according to the invention serves to cool the enclosure of a pressurized light water-cooled nuclear reactor. As these reactors are well known, FIG. 1 only shows the components necessary for a satisfactory understanding of the invention. Thus, FIG. 1 shows the pressurized vessel 10 of the reactor containing the nuclear core 12, as well as the inlet and outlet tubes 14 for the pressurized water ensuring the transfer of heat given off in the core up to a water-steam circuit (not shown) by means of appropriate steam generators. FIG. 1 also shows the confinement enclosure 16 housing vessel 10. Following a possible accident, the atmosphere 18 within the enclosure is formed by a mixture of air and steam.

According to the invention a device 20 uses the condensation of the water vapour contained in the internal atmosphere 18 to obtain mechanical energy making it possible to fulfil all the functions necessary for safeguarding the installation. More specifically device 20 comprises a turbine 22 into which the air contained in the enclosure is introduced by means of a nozzle 24. The humid air leaving turbing 22 is conveyed by a pipe 26 into a condenser 28. It leaves the latter by a pipe 30, which supplies it to a compressor 32, linked by a pipe 34 with a cooling exchanger 36. The cooled dry air leaving exchanger 36 is returned into the internal atmosphere 18 by a tube 38. As is diagrammatically illustrated in FIG. 1, compressor 32 is rotated by turbine 22. It can in particular be directly fitted to shaft 22a of the turbine. In this configuration pipes 26 and 30 are positioned at right angles with respect to turbine 22 and compressor 32, in such a way that it is necessary to provide deflectors 40, 42.

Condensation of the water vapour in condenser 28 is obtained by heat exchange between the humid air circulating in the latter between pipes 26 and 30 and a cooling fluid, such as cold water, circulating between an intake collector 28a and a discharge collector 28b in exchange tubes 28c or the like. The cold air introduced into intake collector 28a is drawn from a reservoir 44 supplied by gravity from a large volume, cold water supply 46, which is linked with reservoir 44 by a pipe 48 equipped with a valve. This cold water supply 46 can in particular be constituted by the bottom tank of an atmospheric cooler used for producing electric power, such coolers possibly being of a very considerable size, but are generally positioned several hundred meters from the enclosure, which justifies the installation of a reservoir 44 closer to the latter. Pipe 50 linking reservoir 44 with collector 28a is equipped with a pump 52. Preferably pump 52 is also driven by turbine 22, as is symbolically shown at 54 in FIG. 1. The water leaving condenser 28 by discharge collector 28b is removed from the confinement enclosure by a pipe 56, which leads to a row of sprinklers 58 ensuring its atmospheric cooling. A return line to the cold water supply 46 is shown, but if the latter is remote, it may be advantageous to position the row of sprinklers 58 above reservoir 44.

In a comparable manner the dry air introduced into exchanger 36 is cooled by heat exchange with a cooling fluid, which circulates in the exchanger between an intake collector 36a and a discharge collector 36b through a bundle of tubes 36c or the like. Preferably this cooling fluid is also cold water taken from reservoir 44 and whose circulation is ensured by pump 52 driven by turbine 22. To this end pipe 50 has, upstream of pump 52, a branch defining a first pipe 50a issuing into collector 28a of the condenser and a second pipe 50b issuing into collector 36a of the exchanger. In the same way, pipe 60 used for removing the cooling water from the collector 36b of the exchanger joins pipe 56 by which the cooling water is removed from collector 28b of the condenser within enclosure 16. As the cooling water leaving the condenser has a moderate temperature of e.g. 60° C., and as the thermal power to be extracted from exchanger 36 is much less than that to be extracted from the condenser, according to a not shown variant it is also possible to cool the exchanger 36 in series with cooling water from condenser 28.

As shown symbolically at 54, turbine 22 can also drive a pump 62 permitting the extraction of condensed water from condenser 28 and its passage through a pipe 64 to a row of sprinklers 66 located in the upper part of enclosure 16. This sprinkling action contributes to the cooling of the atmosphere within the enclosure, whilst still maintaining there a steam quantity adequate for ensuring the operation of the condensation cycle of device 20.

Figure 2:
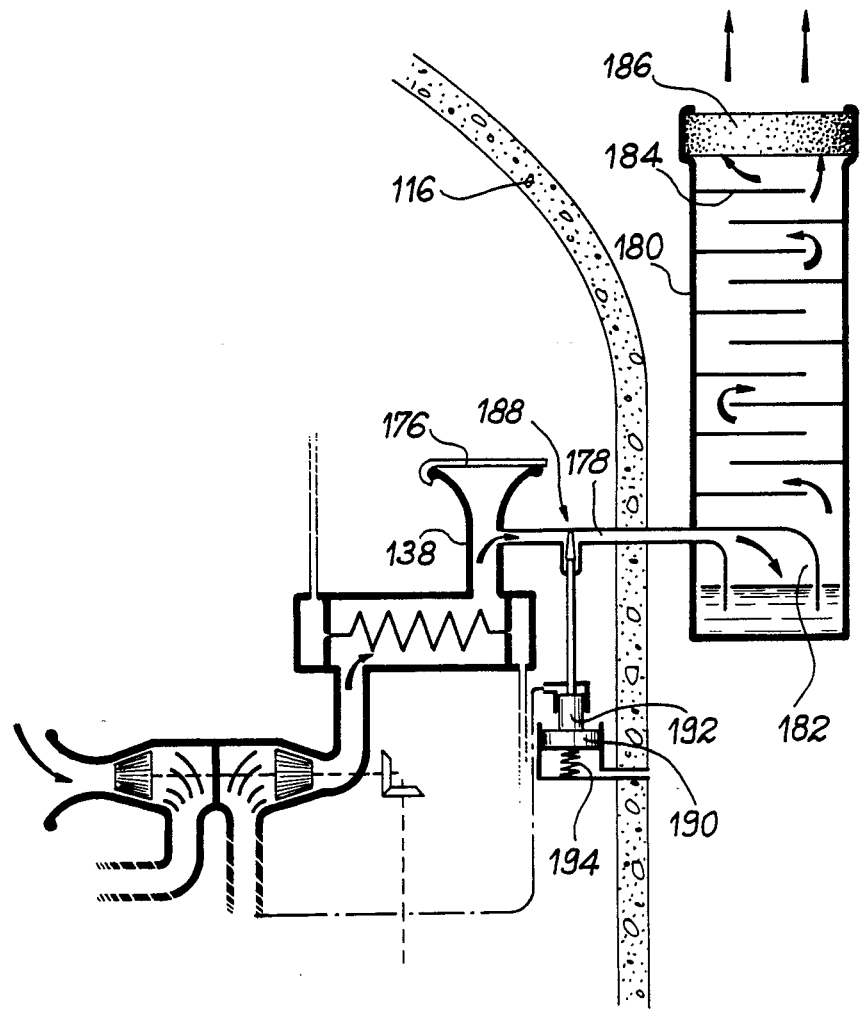
FIG. 2 a partial diagrammatic sectional view illustrating a second embodiment of the means ensuring the starting of the device of FIG. 1.

In pressurized water reactors, the fusion of the core under the action of the residual power after coolant loss, is prevented by means of devices for injecting boric acid solution on to the core, which are operated by external energy sources, which must be very reliable. The device according to the invention makes it possible to operate these devices, even if such sources fail. By means of the transmission symbolically represented in 54, turbine 22 also drives a third pump 68 which removes the boric acid solution from a reservoir 70 contained within enclosure 16 in order to inject it directly into the primary circuit of the reactor via a pipe 72. In FIG. 2 the injection takes place directly into the vessel 10 above the upper level of core 12.

In the case of a pressure rise in the enclosure 16 as a result of the fracture of the wall of the primary circuit, turbine 22 and compressor 32 can be started up by the automatic use of stored energy (compressed air starter, battery-operated electric starter, etc.).

FIG. 1 shows another solution consisting of isolating the condensation space defined within condenser 28 for as long as the pressure in enclosure 16 does not reach a sufficient value for starting purposes. Isolation is brought about by means of a diaphragm 74 positioned in the inlet of nozzle 24 and a valve 76 placed at the outlet of tube 38. When the pressure in enclosure 16 exceeds a valve determined by diaphragm 74, the latter ruptures and air rushes in through nozzle 24 and then circulates in the direction of the arrows in the drawing between turbine 22 and valve 76. The rupturing pressure of the diaphragm 74 is calculated in such a way that the resulting air stream in turbine 22 is then adequate to maintain the condensation cycle obtained in this way in device 20.

FIG. 2 shows another embodiment in which the turbine and compressor are started by using the pressure difference existing in the case of an accident between the pressure in the enclosure 116 and the outside atmospheric pressure. In this case diaphragm 74 is eliminated and valve 176 is maintained at the opening of tube 138. A discharge pipe 178 connects tube 138 to the lower part of a shaft or passage 180 located outside the enclosure and having means suitable for limiting the discharge of radioactive material, such as a bubbler 182, baffles 184 and a filter 186. Pipe 178 is closed by an automatic valve 188. When the latter is open the pressure in the enclosure leads to a gas stream which passes through the complete device according to the invention and brings about its starting up. The automatism of valve 188 must be such that starting is ensured with minimum radioactivity losses to the exterior.

To this end the movement of the closing device of valve 188 is controlled on the one hand by a diaphragm 190 on which is exerted the pressure difference between the atmosphere within enclosure 116 and the outside atmosphere, and on the other hand by a diaphragm 192 connected to the aforementioned diaphragm and on which is exerted the pressure in the condenser. A spring 194 presses the closing device into the closed position and a known and not shown device ensures sudden and complete opening and closing operations. The function of the first diaphragm 190 is to ensure that the closing device opens when the internal pressure exceeds a certain value, which ensures the starting up of the device according to the invention. The function of the second diaphragm 192 is to ensure the closing of the closing device, when the device is started and when the condenser is therefore at a low pressure. However, the closing device will open again if the pressure in the enclosure reaches a high value, so that it is desirable to bring about a discharge to the outside. Such a starting system can be regulated to operate at a high overpressure value in order to make good failures of other starting systems.

In the device according to the invention, it should be noted that the turbocompressor speed is regulated automatically, on the one hand due to the characteristics of the driven pumps and on the other because a possible condenser supplementary pressure drop due to an overspeed increases the power collected at the turbine less than the power absorbed by the compressor.

In exemplified manner, if it is assumed that there is a temperature of 130° C. and a total pressure of 4.332 bars (steam pressure 2.856 bars and air pressure 1.476 bars) in the enclosure, the temperature will be approximately 90° C. at the turbine outlet, whilst the total pressure will be 0.9 bar. The condenser then supplies the mixture at 50° C. under 0.9 bar before the compressor raises it to 4.382 bars and approximately 250° C. Cooling in exchanger 36 brings the mixture to 90° C. before it is returned to the enclosure.

On choosing the nominal air flow rate of 10 kg/second, the power extracted from the condenser is 34 MW, which is suitable for removing the residual power from a 3000 MW reactor. The mechanical power supplied by the turbine is approximately 5 MW and the power absorbed by the compressor approximately 2.5 MW, so that the power then available is quite adequate for the envisaged water pumping operations.

By analogy with existing gas turbines, it would appear possible to use turbines and compressors having a diameter below 0.6 m, whilst the condenser and exchanger do not exceed approximately 10 $m^3$. The device according to the invention therefore has limited overall dimensions and provides a high degree of reliability to the functions of cooling the enclosure after a fracture of the primary circuit of the reactor and cooling the actual core in the case of a total external energy loss. Obviously several devices according to the invention can be installed in parallel in the same enclosure, mechanical energy then being taken from the first device which has already started for starting up the other devices. This arrangement makes it possible to reduce the overall dimensions of the equipment whose industrial development is to be ensured, whilst increasing the reliability of the cooling function.

I claim:

1. In a pressurized water nuclear reactor comprising a confinement enclosure and a primary circuit located in said enclosure, a confinement enclosure cooling device comprising in series a turbine supplied by hot, humid air contained in the enclosure, a condenser in which the air from the turbine is dried and cooled by thermal contact with an external cooling fluid, and a compressor actuated by the turbine, and which returns the dried air into the enclosure.

2. A device according to claim 1, further comprising at least one reservoir containing the cooling fluid and at least one first pump operated by the turbine for supplying cooling fluid to the condenser.

3. A device according to claim 2, wherein a cooling exchanger is located between an outlet of said compressor and the enclosure, whereby the air discharged by the compressor passes through said cooling exchanger before returning to the enclosure.

4. A device according to claim 3, wherein said first pump also supplies cooling fluid from said reservoir to said cooling exchanger.

5. A device according to claim 2 further comprising at least one row of sprinklers positioned above the reservoir containing the cooling fluid in order to simultaneously ensure the cooling of said fluid and its return to the reservoir.

6. A device according to claim 3, further comprising at least one boric acid solution reservoir and at least one second pump operated by the turbine for injecting the boric acid solution into the primary circuit of the reactor.

7. A device according to claim 3, further comprising at least one row of sprinklers positioned in the upper part of the enclosure and at least one third pump operated by the turbine for supplying the row of sprinklers from the condensation water collected in the condensor.

8. A device according to claim 3, wherein the space located downstream of the compressor is linked on the one hand with the interior of the enclosure via a valve and one the other hand with the exterior of the enclosure by a discharge pipe equipped with the retention and filtering means limiting the discharge of radioactive material, said pipe being provided with a valve controlled, in opposing manner, on opening by the overpressure in the enclosure relative to the atmosphere, and on closing by the pressure reduction in the condenser compared with the enclosure.

9. A device according to claim 3, wherein the space within the condensor is initially isolated from the air contained in the enclosure upstream by a diaphragm which fractures when a given overpressure occurs in the enclosure and downstream by a valve.

* * * * *